(12) United States Patent
Maeda et al.

(10) Patent No.: US 7,969,601 B2
(45) Date of Patent: Jun. 28, 2011

(54) DATA COMMUNICATION SYSTEM, DATA COMMUNICATION METHOD AND PROGRAM THEREOF TO PROHIBIT CERTAIN TRANSMISSIONS OF DOCUMENTS

(75) Inventors: Makiko Maeda, Kawasaki (JP); Yoko Saino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 12/024,229

(22) Filed: Feb. 1, 2008

(65) Prior Publication Data
US 2008/0186535 A1     Aug. 7, 2008

(30) Foreign Application Priority Data
Feb. 2, 2007 (JP) ................................. 2007-024433

(51) Int. Cl.
*G06F 3/12* (2006.01)
(52) U.S. Cl. ...................................... 358/1.15; 358/468

(58) Field of Classification Search ................. 358/1.15, 358/400, 440, 468
See application file for complete search history.

(56) References Cited

U.S. PATENT DOCUMENTS

| 6,867,875 | B1 * | 3/2005 | Kanai et al. ................. 358/1.15 |
| 2007/0133543 | A1 * | 6/2007 | Kawasaki ...................... 370/392 |
| 2007/0263258 | A1 * | 11/2007 | Tsuchibuchi et al. ......... 358/400 |

FOREIGN PATENT DOCUMENTS
JP        5-207256 A      8/1993
* cited by examiner

*Primary Examiner* — Thomas D Lee
(74) *Attorney, Agent, or Firm* — Canon USA, Inc. IP Division

(57) ABSTRACT

If information indicating a number of cover sheets included in a job sheet data does not match a number of cover sheet data counted by a sheet count unit, a facsimile transmission unit does not transmit a facsimile document. Moreover, if a facsimile number included in a cover sheet data does not match a facsimile number included in a job sheet data, the facsimile transmission unit does not transmit a facsimile document.

17 Claims, 18 Drawing Sheets

FIG.4

FAX ~401

MARUYAMA STORE LIMITED

X-Y-Z SHIMOMARUKO, OOTA-KU, TOKYO
TEL: 03-1111-2222
FAX: 03-1111-3333

| ID | 0001 |
|---|---|

402

| TO | | FROM | |
|---|---|---|---|
| DIVISION | ABC FOODS | DIVISION | MARUYAMA STORE |
| NAME | MR. MM NN | NAME | XX YY |
| FAX NO. | 03-3333-4444 | FAX NO. | 03-1111-2222 |
| TEL NO. | 03-3333-5555 | TEL NO. | 03-1111-3333 |

403     404

| NUMBER OF SHEETS | 3 | DATE | SEPTEMBER 29, 2006 |
|---|---|---|---|
| RE: | SCHEDULE OF PAYMENT FOR THIS MONTH | | |

405

| COMMENT |
|---|
| DEAR SIRS, <br><br> PLEASE RECEIVE THE PAYMENT SCHEDULE FOR THIS MONTH. <br><br> AMOUNT: 234,231 YEN <br> DATE OF PAYMENT: OCTOBER 4, 2006 <br><br> SINCERELY YOURS, <br> XX YY |

FIG.5

| FAX | 501 | FIRST PREP SCHOOL<br>X-X-X SHIMOMARUKO, OOTA-KU, TOKYO<br>TEL: 03-5555-6666<br>FAX: 03-5555-7777 |
|---|---|---|

| ID | 0002 |
|---|---|

503 / 502

| FROM | | | |
|---|---|---|---|
| DIVISION | MATHEMATICS | FAX NO. | 03-5555-7777 |
| NAME | YY ZZ | TEL NO. | 03-5555-6666 |

504

| | TO | | | |
|---|---|---|---|---|
| 1 | DIVISION | PRE-MED COURSE | FAX NO. | 03-1111-2222 |
| | NAME | MR. AA BB | TEL NO. | 03-1111-1111 |
| 2 | DIVISION | SCIENCE ADVANCED COURSE 1 | FAX NO. | 03-2222-2222 |
| | NAME | MR. CC DD | TEL NO. | 03-2222-3333 |
| 3 | DIVISION | NATIONAL UNIVERSITY SCIENCE COURSE 1 | FAX NO. | 045-333-4444 |
| | NAME | MR. EE FF | TEL NO. | 045-333-3333 |
| 4 | DIVISION | | FAX NO. | |
| | NAME | | TEL NO. | |
| 5 | DIVISION | | FAX NO. | |
| | NAME | | TEL NO. | |

505

| NUMBER OF SHEETS | 2 | DATE | SEPTEMBER 29, 2006 |
|---|---|---|---|
| RE: | INFORMATION ON ADMISSIONS | | |

| COMMENT |
|---|
| DEAR SIRS,<br><br>PLEASE RECEIVE THE ATTACHED ADMISSIONS PAPERS.<br><br>SINCERELY YOURS,<br>YY ZZ |

FIG.13

| FAX NO. | COVER SHEET ID | TRANSMISSION RESULT | |
|---|---|---|---|
| 03-3333-4444 | 001 | TRANSMISSION SUCCESSFUL | ~1302 |
| 03-1111-2222 | 0002 | TRANSMISSION SUCCESSFUL | ~1303 |
| 03-2222-2222 | 0002 | TRANSMISSION ERROR | ~1304 |
| 045-333-4444 | 0002 | TRANSMISSION SUCCESSFUL | ~1305 |

| COVER SHEET ID | NUMBER OF DESTINATIONS | NUMBER OF SUCCESSFUL TRANSMISSIONS |
|---|---|---|
| 0002 | 3 | 2 |

FIG.17

| FAX |
|---|

| FIRST PREP SCHOOL |
|---|
| X-X-X SHIMOMARUKO, OOTA-KU, TOKYO<br>TEL: 03-5555-6666<br>FAX: 03-5555-7777 |

| ID | 0002 |
|---|---|

| FROM | | | |
|---|---|---|---|
| DIVISION | MATHEMATICS | FAX NO. | 03-5555-7777 |
| NAME | YY ZZ | TEL NO. | 03-5555-6666 |

| | | TO | | |
|---|---|---|---|---|
| 1 | DIVISION | PRE-MED COURSE | FAX NO. | 03-1111-2222 |
| | NAME | MR. AA BB | TEL NO. | 03-1111-1111 |
| 2 | DIVISION | SCIENCE ADVANCED COURSE 1 | FAX NO. | 03-2222-2222 |
| | NAME | MR. CC DD | TEL NO. | 03-2222-3333 |
| 3 | DIVISION | NATIONAL UNIVERSITY SCIENCE COURSE 1 | FAX NO. | 045-333-4444 |
| | NAME | MR. EE FF | TEL NO. | 045-333-3333 |
| 4 | DIVISION | | FAX NO. | |
| | NAME | | TEL NO. | |
| 5 | DIVISION | | FAX NO. | |
| | NAME | | TEL NO. | |

| NUMBER OF SHEETS | 2 | DATE | SEPTEMBER 29, 2006 |
|---|---|---|---|
| RE: | INFORMATION ON ADMISSIONS | | |

| COMMENT |
|---|
| DEAR SIRS,<br><br>PLEASE RECEIVE THE ATTACHED ADMISSIONS PAPERS.<br><br>SINCERELY YOURS,<br>YY ZZ |

FIG.18

JOB

| NUMBER OF COVER SHEETS | 1 | ~1801 |

| No | COVER SHEET ID | FAX NO. |
|---|---|---|
| 1 | 001 | 03-3333-4444 |
| 2 | 002 | 03-1111-2222 |
| 3 | 002 | 03-2222-2222 |
| 4 | 002 | 045-333-4444 |
| 5 | | |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

DATA COMMUNICATION SYSTEM, DATA COMMUNICATION METHOD AND PROGRAM THEREOF TO PROHIBIT CERTAIN TRANSMISSIONS OF DOCUMENTS

BACKGROUND OF THE INVENTION

1. Field of the Invention

The present invention relates to a data communication system and a data communication method.

2. Description of the Related Art

Conventionally, there is a data communication system which communicates data using various communication methods such as a facsimile communication method. In a case where a data communication system uses a facsimile communication method to transmit data, a user who operates the system inputs a facsimile number that specifies a destination of the data into the data communication system. The data communication system then sends the facsimile data to the destination specified by the facsimile number input by the user.

Further, there is a method for inputting a facsimile number into a data communication system in which the data communication system reads a cover sheet on which the facsimile number is indicated, and recognizes the facsimile number. (e.g., refer to Japanese Patent Application Laid-Open No. 05-207256.)

However, the data communication system discussed in Japanese Patent Application Laid-Open No. 05-207256 sends data to an incorrect destination if the facsimile number indicated on a cover sheet is misrecognized. To solve such a problem, the accuracy in recognizing the facsimile number can be improved. However, a recognition process takes a long time when the recognition accuracy is improved, which is not always desirable.

Furthermore, if there is an error in the facsimile number indicated on the cover sheet, data is transmitted without checking of the error. To prevent such a problem, a person other than the user who created the cover sheet needs to check whether the number on the cover sheet is correct so that data is not sent to an incorrect number (destination). However, since the person visually checks the number, the task is complex and takes a long time.

SUMMARY OF THE INVENTION

The present invention is directed to a data communication apparatus and a data communication method, that prevents transmission of a facsimile document to an incorrect destination in a case where information specifying an destination that is indicated on a cover sheet of the facsimile document is misrecognized, or the information itself indicated on the cover sheet is incorrect.

According to an aspect of the present invention, a data communication apparatus includes an input unit configured to input image data by reading an image on an original document, a transmission unit configured to transmit image data input by the input unit to at least one of a plurality of destinations, a determination unit configured to determine whether image data input by the input unit is document data to be transmitted to the destination, cover sheet data which includes destination information for specifying a destination of the document data, or job sheet data which includes verification information for verifying the destination specifying information included in the cover sheet data, and a control unit configured to control the transmission unit to transmit a document data corresponding to the cover sheet data to a destination specified by the destination specifying information if the destination specifying information included in the cover sheet data matches the verification information included in the job sheet data, wherein, if the determination unit determines that a plurality of pages of image data continuously input by the input unit includes the cover sheet data, the document data corresponding to the cover sheet data, and the job sheet data, the control unit prohibits transmission of document data corresponding to the cover sheet data to a destination specified by the destination specifying information if the destination specifying information included in the cover sheet data does not match the verification information included in the job sheet data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a cover sheet used when transmitting a facsimile document to a single destination.

FIG. 5 illustrates an example of a cover sheet used when transmitting a facsimile document to a plurality of destinations.

FIG. 13 illustrates a transmission information management table according to the second exemplary embodiment of the present invention.

FIG. 16 illustrates an example of a summary table.

FIG. 17 illustrates an example of a re-transmission cover sheet.

FIG. 18 illustrates an example of a re-transmission job sheet.

DETAILED DESCRIPTION OF THE EMBODIMENTS

Various exemplary embodiments, features, and aspects of the invention will be described in detail below with reference to the drawings.

Figure 1:
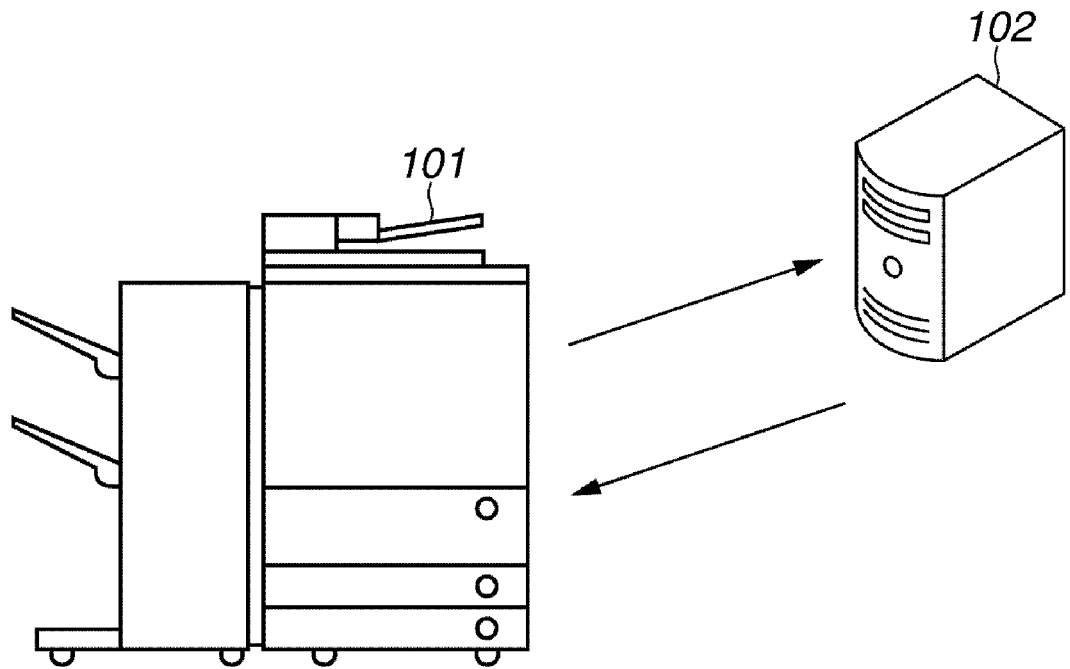
FIG. 1 illustrates an entire configuration of a data communication system according to a first exemplary embodiment of the present invention.

FIG. 1 illustrates an entire configuration of a data communication system according to a first exemplary embodiment of the present invention.

Referring to FIG. 1, a data communication apparatus 101 reads a plurality of sheets of an original document (i.e., sheets of paper on which an image is printed) as image data. Additionally, the data communication apparatus 101 converts the image data to a facsimile data and transmits the facsimile data to an external apparatus by a facsimile communication method. Moreover, an information processing apparatus 102 which functions as a computer, confirms whether there is an error in a transmission process of the data communication apparatus 101. A system including the data communication apparatus 101 and the information processing apparatus 102 will be referred to as a data communication system in the first exemplary embodiment.

Figure 2:
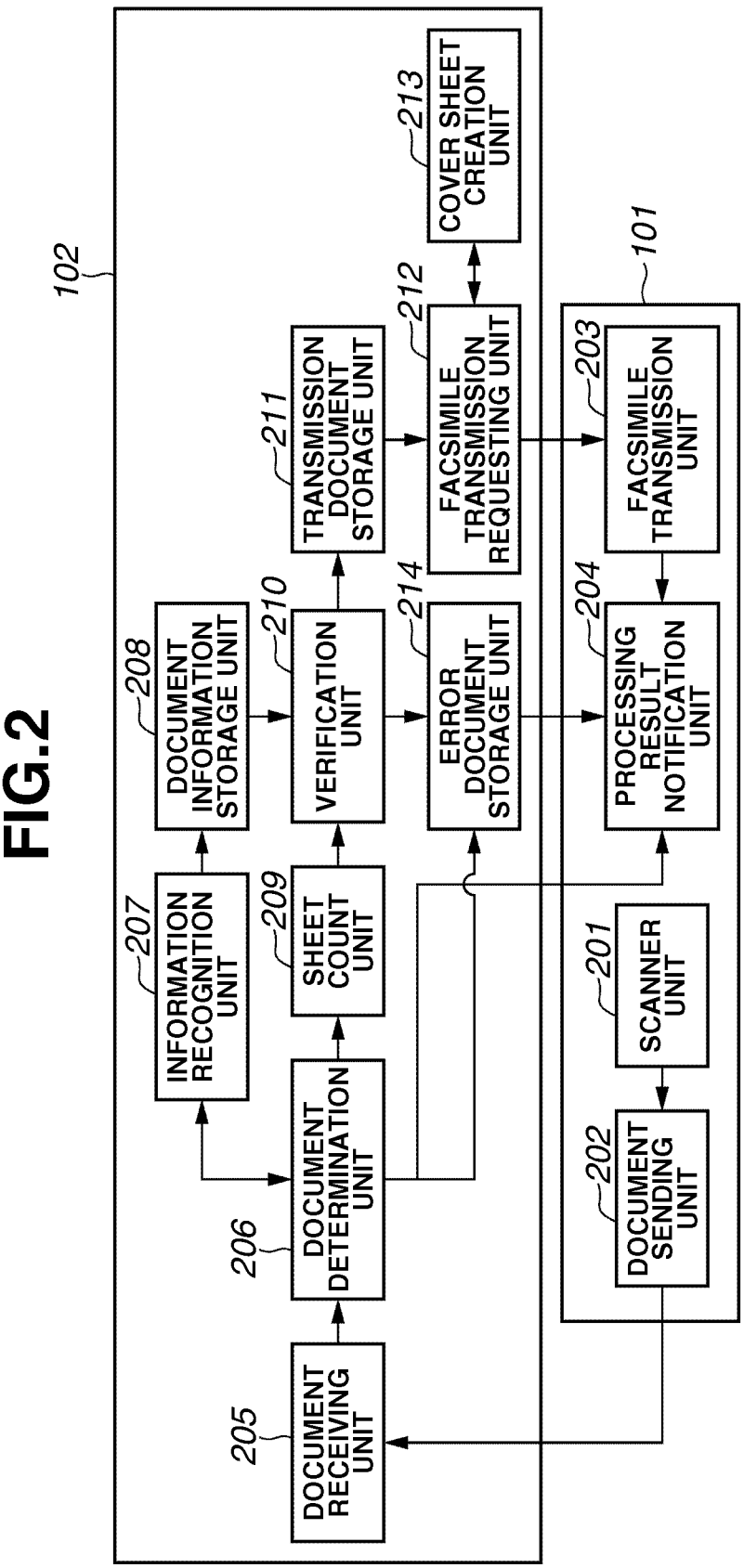
FIG. 2 illustrates a block diagram of a hardware configuration of the data communication system according to the first exemplary embodiment of the present invention.

FIG. 2 illustrates a block diagram of a hardware configuration of the data communication system according to the first exemplary embodiment of the present invention.

The data communication apparatus 101 includes a scanner unit 201, a document sending unit 202, a facsimile transmission unit 203, and a processing result notification unit 204. The information processing apparatus 102 includes a document receiving unit 205, a document determination unit 206, an information recognition unit 207, a document information storage unit 208, a sheet count unit 209, and a verification unit 210. Moreover, the information processing apparatus 102 includes a transmission document storage unit 211, a facsimile transmission requesting unit 212, a cover sheet creation unit 213, and an error document storage unit 214.

The document determination unit 206, the information recognition unit 207, the sheet count unit 209, the verification unit 210, the facsimile transmission requesting unit 212, and the cover sheet creation unit 213 each include a central processing unit (CPU) and a memory that stores a program to be executed by each unit. The CPU in each unit reads out a program from the memory and executes the program to realize functions that will be described below.

Instead of providing each unit with a CPU as described above, one CPU can be provided in the information processing apparatus 102. In such a case, the information processing apparatus 102 includes a memory that stores a program for realizing the functions of the document determination unit 206, the information recognition unit 207, the sheet count unit 209, the verification unit 210, the facsimile transmission requesting unit 212, and the cover sheet creation unit 213.

Moreover, the CPU included in the information processing apparatus 102 reads and executes programs stored in a memory to realize functions of each unit that will be described below.

Furthermore, the document information storage unit 208, the error document storage unit 214, and the transmission document storage unit 211 are storage devices such as a random access memory (RAM) for storing information. The document information storage unit 208, the error document storage unit 214, and the transmission document storage unit 211 can be three different storage devices. Alternatively, three memory areas can be arranged in one storage device, so that each storage area can be provided to be used by each of the above-described units.

Processes performed by each unit in the data communication apparatus 101 and the information processing apparatus 102 are described below.

An example of an original document that the data communication system transmits to an external apparatus will be described below with reference to FIG. 3.

Figure 3:
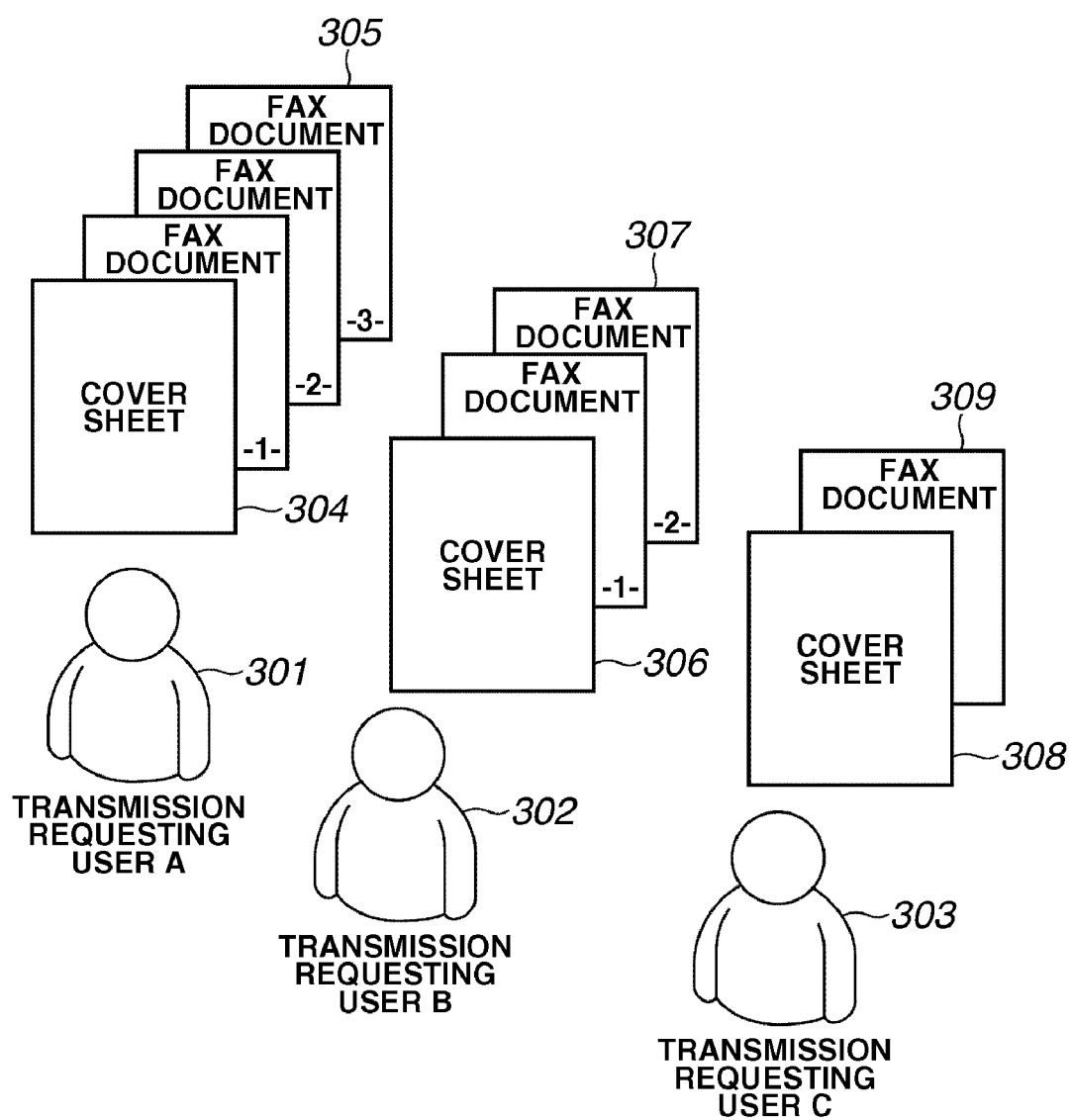
FIG. 3 illustrates an example of an original document which is transmitted to an external apparatus by the data communication system according to an exemplary embodiment of the present invention.

Referring to FIG. 3, a transmission requesting user A 301 requests transmission of a facsimile document (FAX document) as a transmission document. A transmission requesting user B 302 requests transmission of a FAX document, and a transmission requesting user C 303 requests transmission of a FAX document.

A cover sheet 304 is a sheet on which at least a facsimile number specifying a destination of a facsimile document 305 that the transmission requester A 301 desires to transmit is indicated (printed). Moreover, a cover sheet 306 is a sheet on which at least a facsimile number specifying a destination of a facsimile document 307 that the transmission requester B 302 desires to transmit is indicated (printed). A cover sheet 308 is a sheet on which at least a facsimile number that is a transmission address for specifying a destination of a facsimile document 309 that the transmission requester C 303 desires to transmit is indicated (printed).

In addition to the facsimile number specifying the destination, information about the destination (such as a name of the destination or a message to be transmitted to the destination) is printed on the cover sheet. In addition, information about a number of pages of a facsimile document to be transmitted with the cover sheet is printed on the cover sheet.

An example of a cover sheet will be described below with reference to FIG. 4 which illustrates a cover sheet used in transmitting a facsimile document to a single destination.

Referring to FIG. 4, information 401 is used by the information processing apparatus 102 to determine that the sheet is a cover sheet which includes a facsimile number as destination information that specifies a destination of a facsimile document. Identification data (ID) information 402 indicates an ID of the cover sheet. The ID information 402 is unique for each cover sheet so that each of a plurality of cover sheets corresponding to a job sheet can be distinguished. The ID information 402 can be included in the cover sheet in various forms, such as numerals, a bar code, or a digital watermark. Destination information 403 includes a name of the destination (e.g., company name or name of a person), a facsimile number of the destination, and a telephone number of the destination. Sender information 404 includes a name of the sender (e.g., company name or name of a person), a facsimile number of the sender, and a telephone number of the sender. Page count information 405 indicates a number of pages of a facsimile document that is to be transmitted to a destination.

FIG. 5 illustrates an example of a cover sheet which is different from the cover sheet illustrated in FIG. 4.

FIG. 5 illustrates a cover sheet used in transmitting facsimile numbers to a plurality of senders. Referring to FIG. 5, information 501 is used by the information processing apparatus 102 to determine that the sheet is a cover sheet which includes a facsimile number as destination information that specifies a destination of a facsimile document. Identification Data (ID) information 502 indicates an ID of the cover sheet. The ID information 502 is unique for each cover sheet so that each of a plurality of cover sheets corresponding to a job sheet can be distinguished. The ID information 502 can be included in the cover sheet by various methods, similar to the ID information 402 described above. Sender information 503 includes name of the destination (e.g., company name or name of a person), a facsimile number of the sender, and a telephone number of the sender. Destination information 504 includes a name of the destination (company name, or name of a person), a facsimile number of the destination, and a telephone number of the destination. Unlike the cover sheet illustrated in FIG. 4, a plurality of destinations can be included on the cover sheet illustrated in FIG. 5. Page count information 505 indicates a number of pages of a facsimile document that is to be transmitted to the destinations together with the cover sheet illustrated in FIG. 5.

There are various methods of transmitting image data as a plurality of document sets in which one set of documents includes the above-described cover sheet and a facsimile document to be transmitted to destinations indicated on the cover sheet. In one method, the scanner unit 201 reads each set of a cover sheet and a facsimile document. In another method, the scanner unit 201 collectively (or consecutively) reads a plurality of sets of a cover sheet and a facsimile document.

Generally, a user who requests transmission of a facsimile document creates a cover sheet illustrated in FIG. 3. That is, the transmission requester A creates the cover sheet 304, the transmission requester B creates the cover sheet 306, and the transmission requester C creates the cover sheet 308. In a case where three sets of image data as illustrated in FIG. 3 are to be collectively transmitted, the facsimile document can be transmitted to an incorrect destination if there is an error in a facsimile number specifying a destination that is indicated on a cover sheet. Moreover, since the information recognition unit 207 recognizes a facsimile number printed on a cover sheet, the facsimile document can also be transmitted to an incorrect destination if there is an error in the recognition result.

Figure 6:
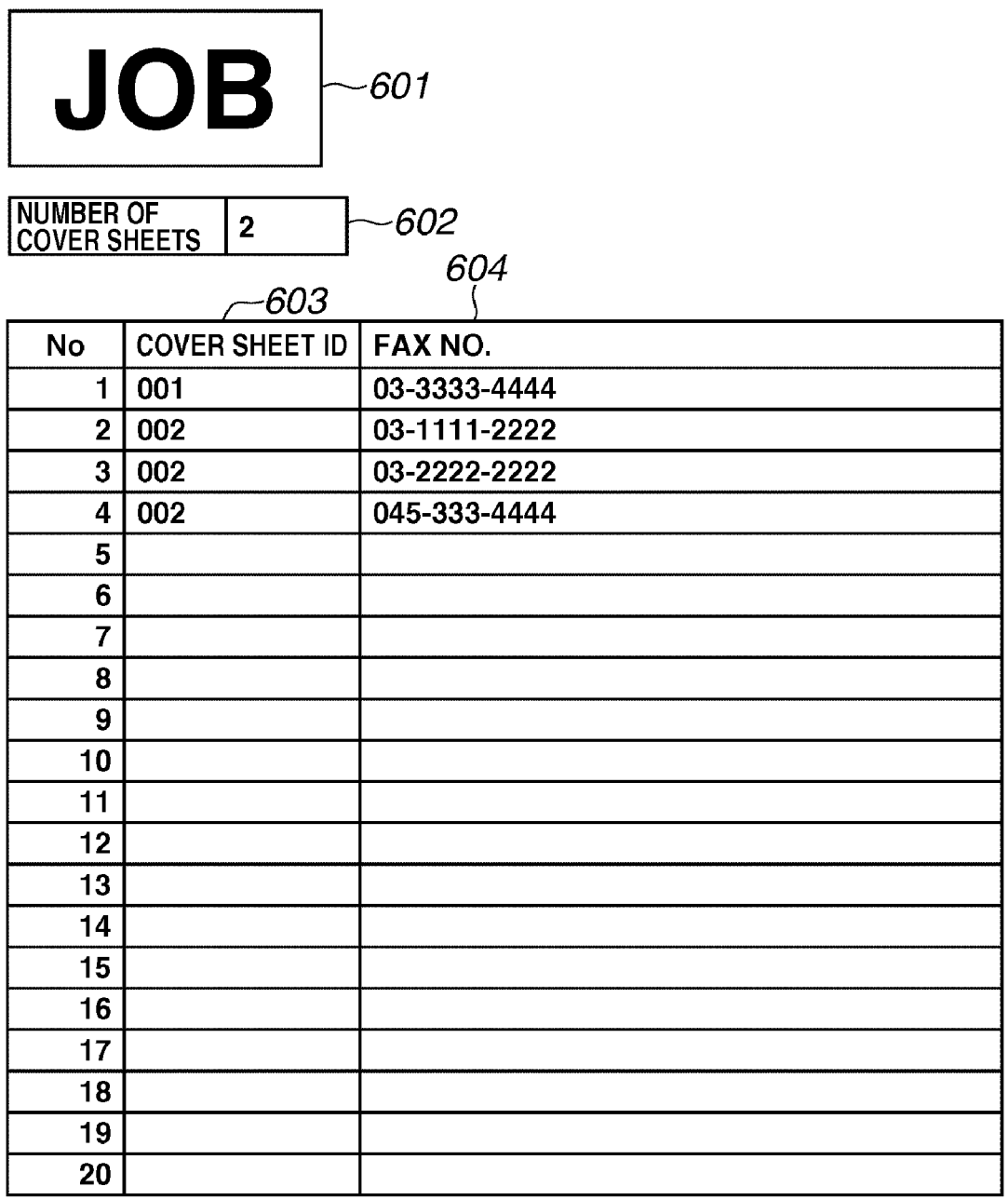
FIG. 6 illustrates an example of a job sheet created by a manager who manages a data communication system.

To solve the above-described problems, a job sheet illustrated in FIG. 6 can be used. The job sheet illustrated in FIG. 6 is created by a manager who manages the data communication system, and is used to verify whether a facsimile number included in the cover sheet is correct. Furthermore, the job sheet is used to verify the number of sets of facsimile documents (and cover sheets) which are to be collectively transmitted.

Referring to FIG. 6, information 601 is used by the information processing apparatus 102 to determine that the sheet is a job sheet which includes a facsimile number as destination information that specifies a destination of a facsimile document. Sheet count information 602 is used to verify the number of cover sheets included in the image data that are to be collectively transmitted. ID information 603 indicates the IDs of the cover sheets included in the image data that are to be collectively transmitted. The ID information 603 is unique for each cover sheet so that each of a plurality of cover sheets can be distinguished. A facsimile number 604 indicates destinations of the facsimile data, and is further used as verification information for verifying a facsimile number that is indicated on a cover sheet specified by the cover sheet ID. The job sheet illustrated in FIG. 6 is used when two facsimile documents corresponding to the two cover sheets illustrated in FIGS. 4 and 5 are collectively transmitted.

Transmission of a facsimile document that uses the above-described cover sheet, facsimile document, and job sheet is described below with reference to FIGS. 7, 8, 9, and 10. The processes illustrated in the flowcharts of FIGS. 7, 8, 9, and 10 are based on image data obtained by the scanner unit 201 that collectively reads the facsimile document, cover sheet, and job data illustrated in FIGS. 3, 4, 5, and 6. Moreover, a CPU (not shown) which is a control unit included in the data communication apparatus 101 performs the process illustrated in FIG. 7 by executing a program stored in a read-only memory (ROM) (not shown).

Figure 7:
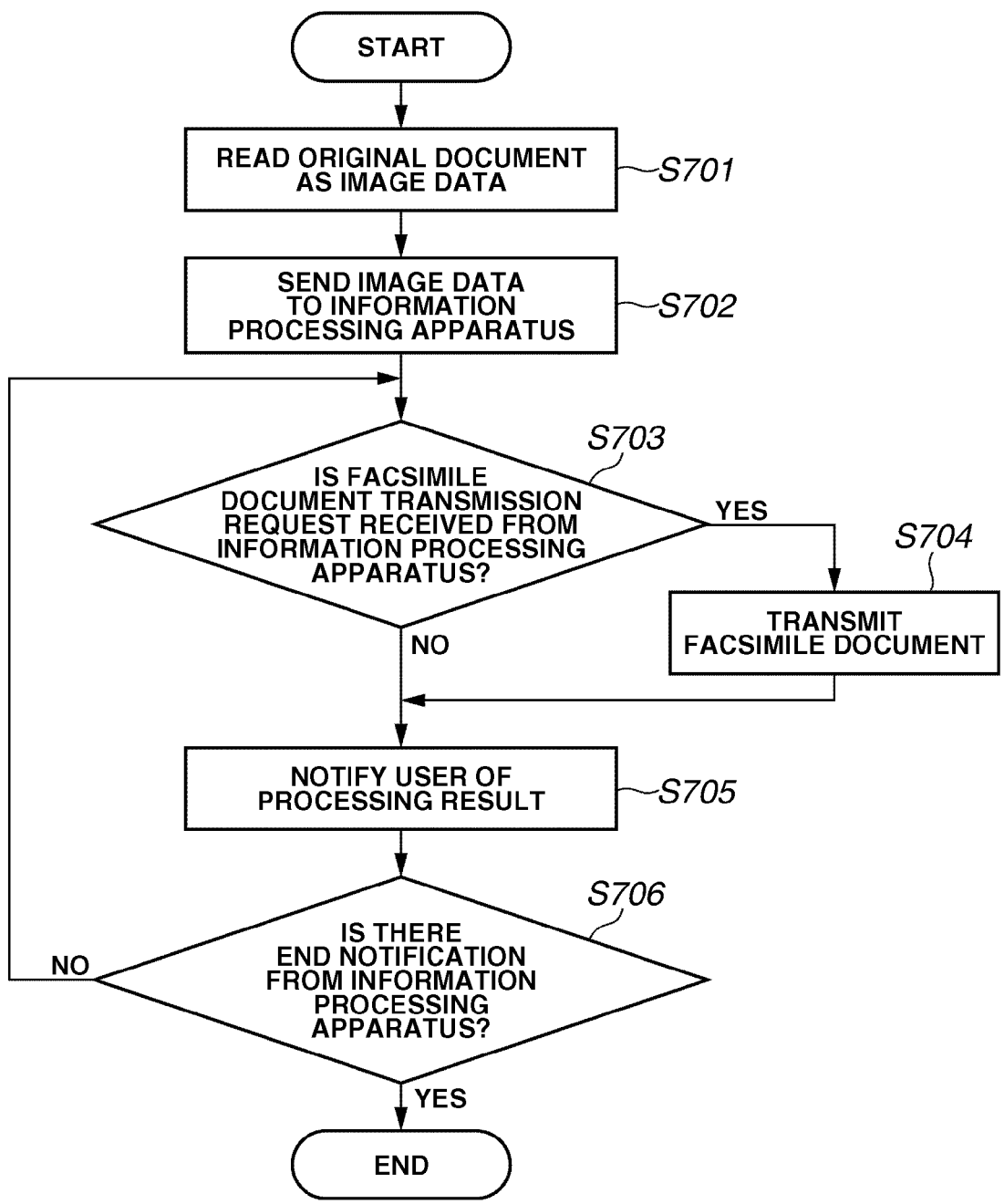
FIG. 7 is a flowchart illustrating a process of transmitting a facsimile document which is performed by the data communication apparatus according to an exemplary embodiment of the present invention.

FIG. 7 is a flowchart illustrating a process performed by the data communication apparatus 101 in transmitting a facsimile document. A CPU (not shown) included in the data communication apparatus 101 performs the process illustrated in FIG. 7 by executing a program stored in a read-only memory (ROM) (not shown). In step S701 of FIG. 7, the scanner unit 201 reads as image data the job sheet illustrated in FIG. 6, the two cover sheets illustrated in FIGS. 4 and 5, and facsimile documents that follow the two cover sheets.

In step S702, the document sending unit 202 sends the image data obtained by the scanner unit 201 in step S701 to the information processing apparatus 102.

In step S703, the facsimile transmission unit 203 determines whether a transmission request to transmit a facsimile document is received from the information processing apparatus 102. If a transmission request is received (YES in step S703), the process proceeds to step S704. On the other hand, if a transmission request is not received (NO in step S703), the process proceeds to step S705. The transmission request includes a facsimile document and cover sheet data corresponding to the facsimile document. Furthermore, the transmission request includes a facsimile number which specifies a destination of the facsimile document.

In step S704, the facsimile transmission unit 203 transmits a set of documents including a cover sheet data and a facsimile document to a destination specified by the facsimile number that is included in the transmission request received in step S703.

In step S705, the processing result notification unit 204 notifies a user of receipt of either an error in the transmission process or completion of the transmission process from the information processing apparatus 102. A user can be notified in various ways. For example, a content of an error can be displayed on an operation panel of a data communication apparatus 101 to notify a user of the error. Then the process proceeds to step S706. In step S706, the facsimile transmission unit 203 determines whether there is an end notification from the information processing apparatus 102. If there is an end notification ("YES" in step S706), the processing flow ends. If there isn't an end notification ("NO" in step S706), the process proceeds to step S703.

Figure 8:
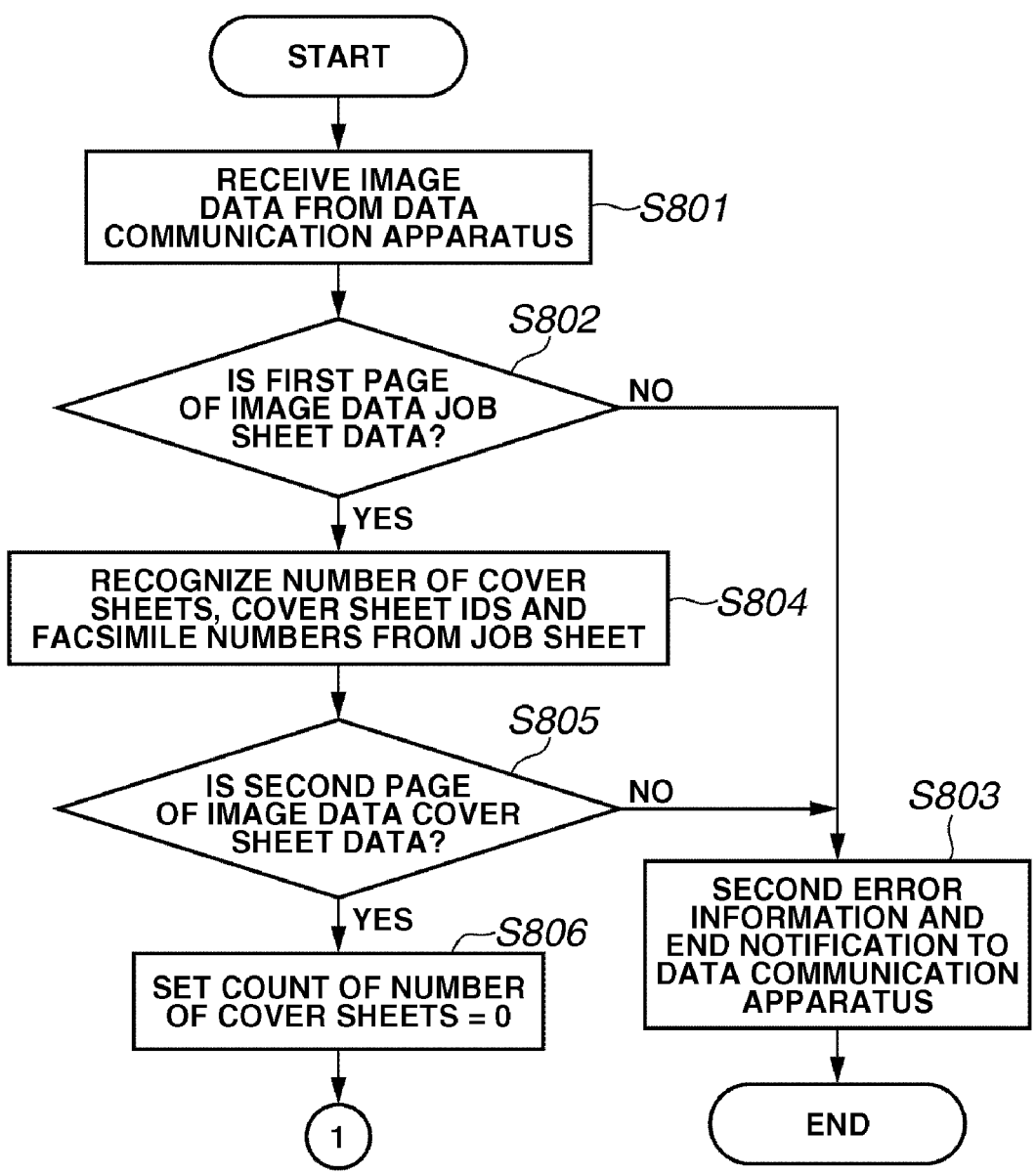
FIG. 8 is a flowchart illustrating a process of transmitting a facsimile document which is performed by an information processing apparatus according to an exemplary embodiment of the present invention.
Figure 9:
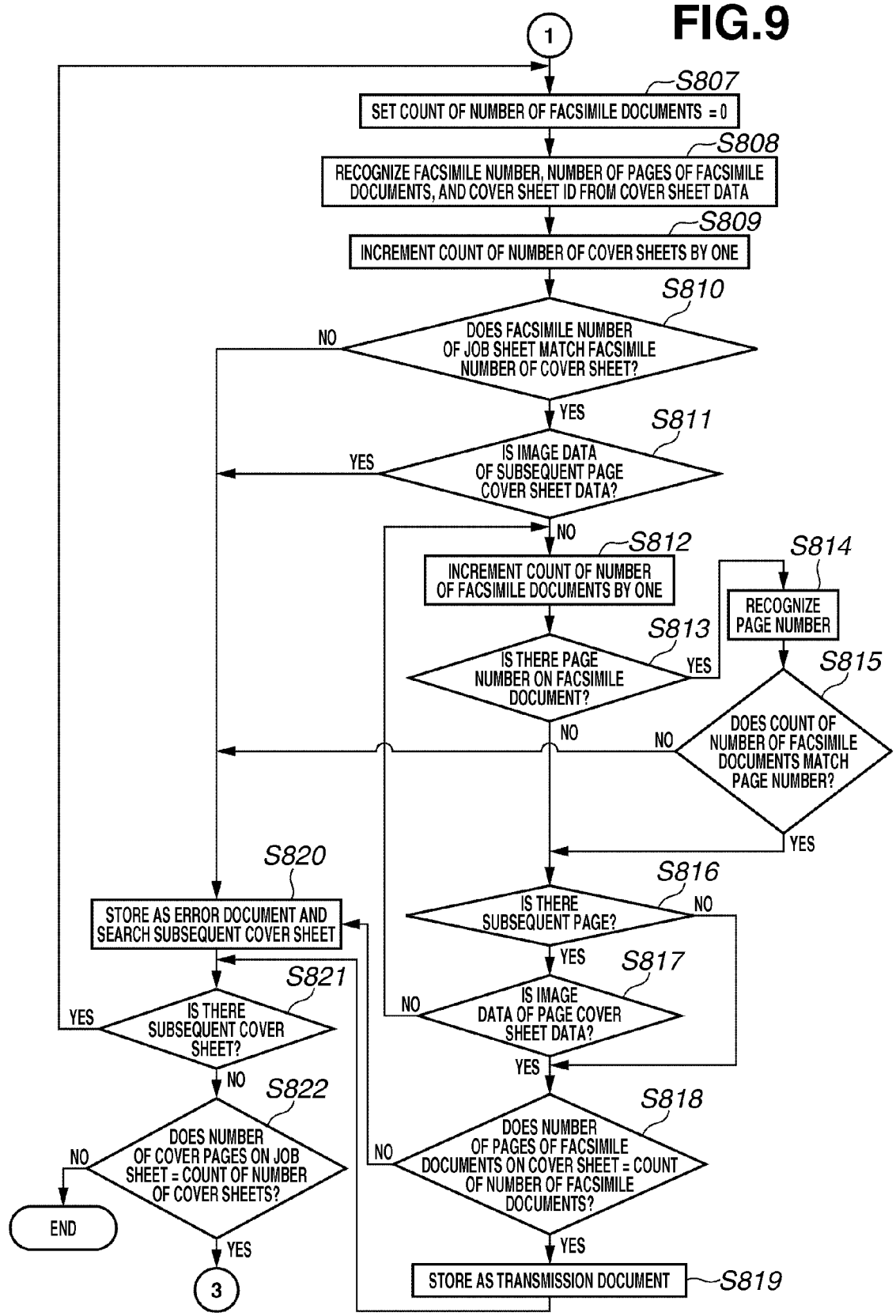
FIG. 9 is a flowchart illustrating a process of transmitting a facsimile document which is performed by an information processing apparatus according to an exemplary embodiment of the present invention.
Figure 10:
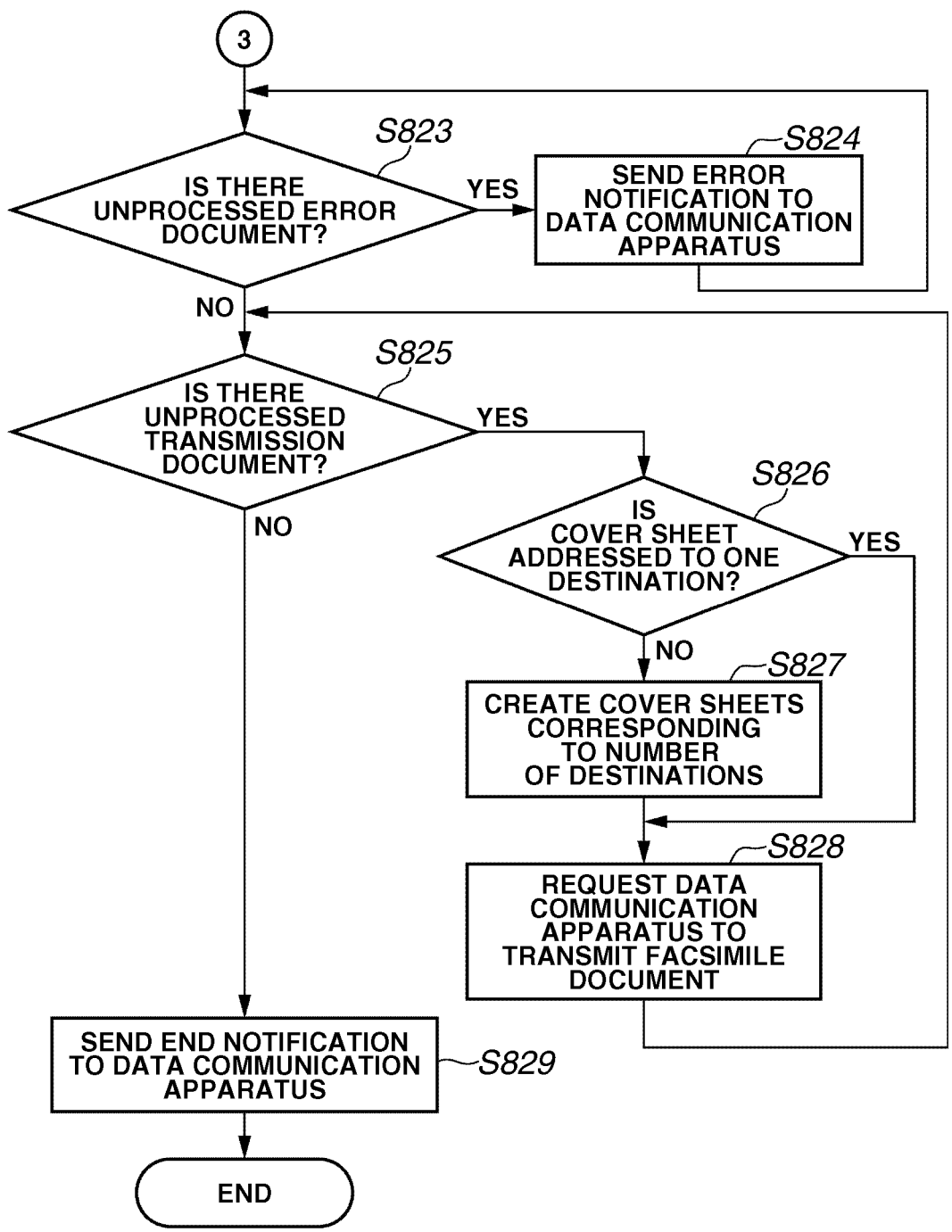
FIG. 10 is a flowchart illustrating a process of transmitting a facsimile document which is performed by an information processing apparatus according to an exemplary embodiment of the present invention.

FIGS. 8, 9, and 10 illustrate flowcharts of processes performed by the information processing apparatus 102 when transmitting a facsimile document. The processes illustrated in FIGS. 8, 9, and 10 are performed by a CPU (not shown) included in the information processing apparatus 102 that executes a program.

In step S800 of FIG. 8, the document receiving unit 205 receives image data including document data from the data communication apparatus 101. The document receiving unit 205 then transmits image data on a page-by-page basis to the document determination unit 206.

In step S801, the document determination unit 206 determines whether the first page of the image data received from the document receiving unit 205 is a job sheet data. If the document determination unit 206 determines that the information 601 is included in the first page of the image data (YES in step S801), the document determination unit 206 transmits the image data to the information recognition unit 207. The process then proceeds to step S803. On the contrary, if the information 601 is not included in the first page of the image data (NO in step S801), the process proceeds to step 802. In step S802, the document determination unit 206 transmits error information which indicates that the facsimile document will not be correctly transmitted, and a notification about ending the transmission process, to the processing result notification unit 204 in the data communication apparatus 101.

In step S803, the information recognition unit 207 recognizes cover sheet data count information indicating the number of cover sheet data, from the first page of image data (i.e., job sheet data) transmitted from the document determination unit 206. Further, the information recognition unit 207 recognizes a cover sheet ID for identifying a cover sheet, and a facsimile number for specifying the destination of the facsimile document. The information recognition unit 207 stores information that is recognized from the job sheet data into the document information storage unit 208.

In step S804, the document determination unit 206 determines whether the second page of image data received from the document receiving unit 205 is a cover sheet data. If the document determination unit 206 determines that the information 401 is included in the second page of the image data (YES in step S804), the document determination unit 206 transmits the image data of the second page to the information recognition unit 207. The process then proceeds to step S805. On the other hand, if the document determination unit 206 determines that the information 401 is not included in the second page of the image data (NO in step S804), the process proceeds to step S802.

In step S805, the sheet count unit 209 sets the count of number of cover sheets to 0. In step S806 of the flowchart illustrated in FIG. 9, the sheet count unit 209 sets the count of sheet number in the facsimile documents to 0.

In step S807, the information recognition unit 207 recognizes the facsimile number of the destination, the number of pages, and the cover sheet ID of the facsimile document from the second page of the image data (i.e., cover sheet data). The information recognition unit 207 stores the information recognized from the cover sheet data in the document information storage unit 208. In step S808, the verification unit 210 verifies that the cover sheet ID included in the job sheet data stored in the document information storage unit 208 matches the cover sheet ID included in the cover sheet data stored in the document information storage unit 208. If the cover sheet IDs match (YES in step S808), the process proceeds to step S809. On the other hand, if the cover sheet IDs do not match (NO in step S808), the process proceeds to step S820.

In step S809, the sheet count unit 209 increments the count of number of cover sheets by one. In step S810, the verification unit 210 verifies that the facsimile number included in the job sheet data stored in the document information storage unit 208 matches the facsimile number included in the cover sheet data stored in the document information storage unit 208. If the facsimile numbers match (YES in step S810), the process proceeds to step S811. On the other hand, if the facsimile numbers do not match (NO in step S810), the process proceeds to step S820. In step S820, the error document storage unit 214 stores all pages of image data that the document receiving unit 205 receives from the data communication apparatus 101 as an error document.

In step S811, the document determination unit 206 determines whether the image data of a page following a cover sheet data is a cover sheet data. If the image data is not a cover sheet data (NO in step S811), the process proceeds to step S812. If the image data is a cover sheet data (YES in step S811), the process proceeds to step S820.

In step S812, the sheet count unit 209 increments the count of number of pages in the facsimile document by one. In step S813, the information recognition unit 207 determines whether a page number is indicated in a designated location of the facsimile document. If the page number is indicated (YES is step S813), the process proceeds to step S814 in which the information recognition unit 207 recognizes the page number. On the contrary, if the page number is not indicated (NO in step S813), the process proceeds to step S816.

In step S815, the verification unit 210 verifies whether the page number recognized by the information recognition unit 207 in step S814 matches the value counted by the sheet count unit 209. If the page number matches the counted value (YES in step S815), the process proceeds to step S816. If the page number does not match the counted value (NO in step S815), the process proceeds to step S820.

In step S816, the document determination unit 206 determines whether there is image data of a subsequent page. If there is image data of a subsequent page (YES in step S816), the process proceeds to step S817.

In step S817, the document determination unit 206 determines whether the image data is a cover sheet data. If the image data is a cover sheet data (YES in step S817), the process proceeds to step S818. If the image data is a facsimile document data (NO in step S817), the process returns to step S812.

The above-described process from steps S812 to S817 is performed to transmit a correct number of pages of the facsimile document in a correct order. Such a process can prevent an error of transmitting the pages of a facsimile document in a wrong order, or transmitting the wrong number of pages. If the page number is not indicated in a designated location (e.g., at the center of the lower end of the page), the above-described process is not performed. Such a facsimile document without page numbers can still be transmitted.

In step S818, the verification unit 210 determines whether the number of pages of the facsimile document recognized from the cover sheet data matches the number of pages of the facsimile document counted by the sheet count unit 209. If the number of pages match (YES in step S818), the process proceeds to step S819. In step S819, the transmission document storage unit 211 stores the cover sheet data and the facsimile data as one set of document. The process then proceeds to step S821. If the number of pages doesn't match (NO in step S818), the process proceeds to step S820.

In step S821, the document determination unit 206 determines whether the image data of a subsequent page is a cover sheet data. If the image data is a cover sheet data (YES in step S821), the process returns to step S807. If the image data is not a cover sheet data (NO in step S821), the process proceeds to step S822.

In step S822, the verification unit 210 verifies whether the number of cover sheets indicated on the job sheet matches the number of cover sheets counted by the sheet count unit 209. If the numbers of cover sheets match (YES in step S822), the process proceeds to step S823 in the flowchart illustrated in FIG. 10. If the number of cover sheets do not match (NO in step S822), the process ends.

In step S823, the error document storage unit 214 determines whether there is a document stored as an error document. If there is an unprocessed error document (YES in step S823), the process proceeds to step S824. In step S824, an error notification is sent to the data communication apparatus 101. If the error document storage unit 214 determines that there is no error document (NO in step S823), the process proceeds to step S825.

In step S825, the facsimile transmission requesting unit 212 determines whether there is a facsimile document that is not transmitted, in the transmission document storage unit 211. If there is a facsimile document that is not transmitted (YES in step S825), the process proceeds to step S826. If there is no facsimile document that is not transmitted (NO in step S825), the process proceeds to step S829.

In step S826, the facsimile transmission requesting unit 212 determines whether the cover sheet included in the facsimile document is a cover sheet addressed to a single destination, as illustrated in FIG. 4, or a cover sheet addressed to a plurality of destinations, as illustrated in FIG. 5. If the cover sheet is addressed to a single destination (YES in step S826), the process proceeds to step S828. On the contrary, if the cover sheet is addressed to a plurality of destinations (NO in step S826), the process proceeds to step S827.

In step S827, since the cover sheet is addressed to a plurality of destinations, the cover sheet creation unit 213 creates cover sheets corresponding to each of a plurality of destinations. The cover sheets corresponding to the plurality of destinations can be created from one cover sheet addressed to the plurality of destinations by the following methods. For example, information other than the information about the actual destination of the facsimile document that is indicated on the cover sheet illustrated in FIG. 5 can be masked. Moreover, the information about the actual destination can be extracted from the cover sheet illustrated in FIG. 5 to create a new cover sheet.

In the first method, a first cover sheet on which only the destination No. 1 (facsimile number 03-1111-2222) is indicated is created from the cover sheet illustrated in FIG. 5 by masking the destination No. 2 (facsimile number 03-2222-2222) and the destination No. 3 (facsimile number 045-333-4444). A second cover sheet on which only the destination No. 2 is indicated is created by masking the destination No. 1 (facsimile number 03-1111-2222) and the destination No. 3 (facsimile number 045-333-4444). Furthermore, a third cover sheet on which only the destination No. 3 is indicated is created by masking the destination No. 1 (facsimile number 03-1111-2222) and the destination No. 2 (facsimile number 03-2222-2222).

The above-described method is employed to create cover sheets corresponding to each of a plurality of destinations instead of using the cover sheet illustrated in FIG. 5 which is addressed to a plurality of destinations. This is to prevent a receiver of the facsimile document from knowing information about the destinations other than that of the actual destination. However, if a user transmitting the facsimile document does not mind that information about destinations other than the actual destination is known to the receiver of the facsimile document, the user can use the same cover sheet illustrated in FIG. 5 for transmission to a plurality of destinations. In such a case, when the cover sheet is determined as a cover sheet for a plurality of destinations, step S827 is not performed, and the process proceeds to step S828.

In step S828, the facsimile transmission requesting unit 212 requests the data communication apparatus 101 to transmit a facsimile document stored in the transmission document storage unit 211 which is not yet transmitted to the destination indicated on the cover sheet. The process then proceeds to step S825. That is, the processes in steps S825 to S828 are repeated if there is a facsimile document stored in the transmission document storage unit 211 that is not yet transmitted.

If the cover sheet is addressed to a plurality of destinations, as illustrated in FIG. 5, the cover sheet creation unit 213 creates cover sheets corresponding to each of the plurality of destinations in step S827. Moreover, the facsimile transmission requesting unit 212 makes a number of transmission requests corresponding to the number of destinations. Furthermore, each transmission request includes a set of documents including a facsimile document and a cover sheet created by the cover sheet creation unit 213, and a facsimile number specifying the destination of the document set. For example, in the case of the cover sheet illustrated in FIG. 5, since a facsimile document is to be transmitted to three destinations, the information processing apparatus 102 issues three transmission requests to the data communication apparatus 101.

In step S825, if the facsimile transmission requesting unit 212 determines that there is no unprocessed transmission document (NO in step S825), the process proceeds to step S829, where information processing apparatus 102 notifies the data communication apparatus 101 that the transmission process is completed.

As described above, according to the present embodiment, transmission of a facsimile document to an incorrect destination can be prevented. Such a transmission can be prevented in a case where a facsimile number indicating a destination on a cover sheet of the facsimile document is misrecognized, or the facsimile number itself which is included in the cover sheet is incorrect.

The data communication system according to the present embodiment includes two independent apparatuses, i.e., the data communication apparatus 101 and the information processing apparatus 102. However, the present invention is not limited to the above configuration. For example, a data communication apparatus including the functions of both the data communication apparatus 101 and the information processing apparatus 102 of the present embodiment can function as a data communication system.

A second exemplary embodiment of the present invention creates a job sheet and a cover sheet for re-transmission of a facsimile document in a case where an error has occurred during a facsimile transmission in the data communication apparatus 101.

Figure 11:
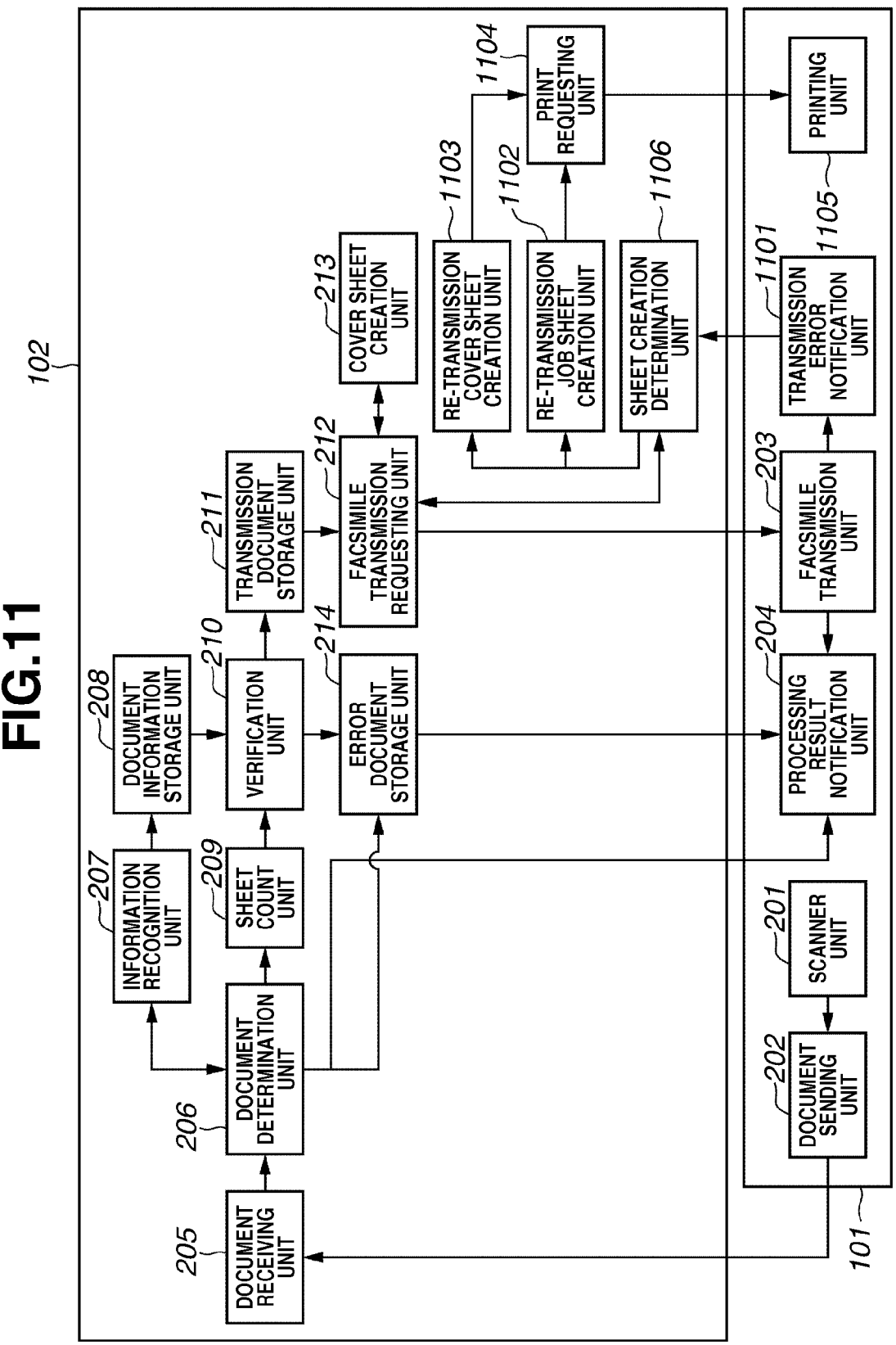
FIG. 11 illustrates a block diagram of a hardware configuration of the data communication system according to a second exemplary embodiment of the present invention.

FIG. 11 illustrates a hardware configuration of a data communication system according to the second exemplary embodiment of the present invention. The configuration illustrated in FIG. 11 is similar to the configuration illustrated in FIG. 2. The difference is that the configuration in FIG. 11 includes a transmission error notification unit 1101, a re-transmission job sheet creation unit 1102, a re-transmission cover sheet creation unit 1103, a sheet creation determination unit 1106, a print requesting unit 1104, and a printing unit 1105. Since processes of the present embodiment are similar to those of the first exemplary embodiment, except for the processes described below, a description about the processes similar to the first exemplary embodiment are omitted herein.

Referring to FIG. 11, the facsimile transmission unit 203 in the data communication apparatus 101 transmits a facsimile document according to a request from the facsimile transmission requesting unit 212 in the information processing apparatus 102.

If an error occurs during the transmission, the transmission error notification unit 1101 detects that an error has occurred.

If a transmission error is detected, the transmission error notification unit 1101 notifies the sheet creation determination unit 1106 of the error.

The sheet creation determination unit 1106 determines whether it is necessary to create a re-transmission job sheet and a re-transmission cover sheet. The sheet creation determination unit 1106 then requests the re-transmission job sheet creation unit 1102 and the re-transmission cover sheet creation unit 1103 in the information processing apparatus 102 to create a re-transmission job sheet and a re-transmission cover sheet respectively.

The print requesting unit 1104 then requests the printing unit 1105 in the data communication apparatus 101 to make prints according to the re-transmission job sheet data and re-transmission cover sheet data. Upon receiving a print request from the print requesting unit 1104, the printing unit 1105 prints and creates the re-transmission job sheet and re-transmission cover sheet.

The creation of a re-transmission job sheet data by the re-transmission job sheet creation unit 1102 and a re-transmission cover sheet data by the re-transmission cover sheet creation unit 1103 is described below.

Figure 12:
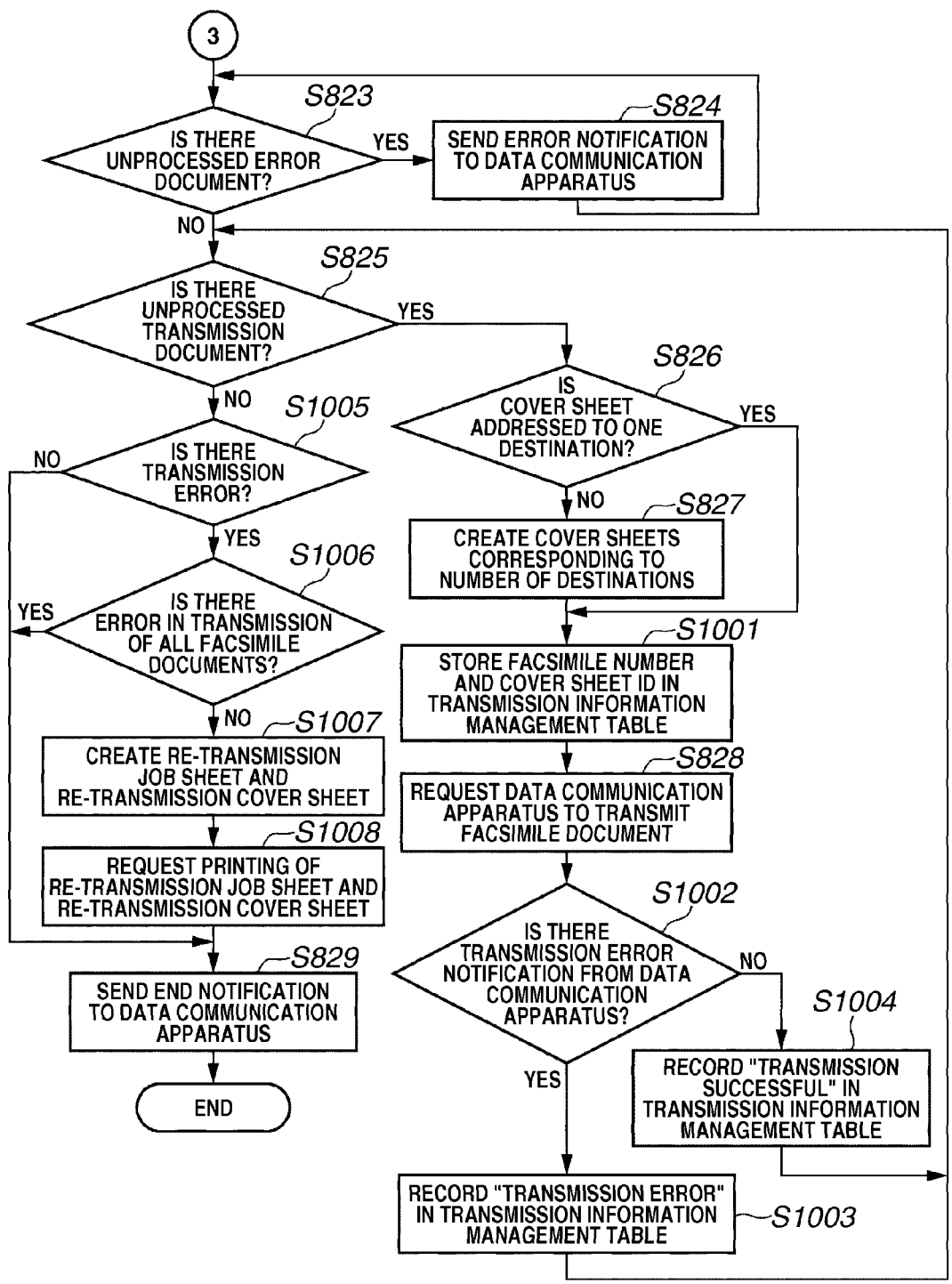
FIG. 12 is a flowchart illustrating aprocess executed by an information processing apparatus according to the second exemplary embodiment of the present invention when performing transmission and re-transmission of a facsimile document.

A process performed by the information processing apparatus 102 in transmitting and re-transmitting a facsimile document is described below with reference to the flowchart illustrated in FIG. 12. FIG. 12 is a flowchart illustrating a process performed by the information processing apparatus 102 in transmitting and re-transmitting a facsimile document. The process illustrated in FIG. 12 is performed by the CPU (not shown) in the information processing apparatus 102 executing a program.

The process flow illustrated in FIG. 12 is a modified example of the process flow illustrated in FIG. 10 of the first embodiment. The modified example of the flow is different from FIG. 10 in that steps S1001 to 1008 are added. Consequently, steps S823 to S829 in the flowchart of FIG. 12 are similar to steps S823 to S829 described in FIG. 10. Furthermore, the information processing apparatus 102 in the present embodiment performs the process flows illustrated in FIGS. 8 and 9. Thus, only the steps performed after step S823 will be described herein.

In step S823, the error document storage unit 214 determines whether there is an error document which is stored as an error document. If there is an unprocessed error document (YES in step S823), the process proceeds to step S824 in which the error document storage unit 214 notifies the data communication apparatus 101 of the error. If the error document storage unit 214 determines that there is no error document (NO in step S823), the process proceeds to step S825.

In step S825, the facsimile transmission requesting unit 212 determines whether there is a facsimile document stored in the transmission document storage unit 211 which is not yet transmitted. If there is such a facsimile document (YES in step S825), the process proceeds to step S826. If there is no facsimile document that is not transmitted (NO in step S825), the process proceeds to step S1005.

In step S826, the facsimile transmission requesting unit 212 determines whether the cover sheet included in the facsimile document is a cover sheet addressed to a single destination, as illustrated in FIG. 4, or a cover sheet addressed to a plurality of destinations, as illustrated in FIG. 5. If the cover sheet is addressed to a single destination (YES in step S826), the process proceeds to step S1001. If the cover sheet is addressed to a plurality of destinations (NO in step S826), the process proceeds to step S827.

In step S827, since the cover sheet is addressed to a plurality of destinations, the cover sheet creation unit 213 creates cover sheets corresponding to each of a plurality of destinations. The method of creating cover sheets corresponding to each of a plurality of destinations from the cover sheet addressed to the destinations is as described in the first embodiment.

In step S1001, the facsimile transmission requesting unit 212 stores a facsimile number and a cover sheet ID corresponding to a set of documents including the facsimile document and the cover sheet that the requesting unit 212 requests to be transmitted, in a transmission information management table. A transmission information management table is a table for storing a facsimile number and a cover sheet ID that indicate a destination, in association with information whether the facsimile transmission to the destination was successful.

In step S828, the facsimile transmission requesting unit 212 requests transmission of the facsimile document to the data communication apparatus 101. Upon issuing of the transmission request, the data communication apparatus 101 receives from the information processing apparatus 102 the set of documents including the cover sheet and the facsimile document, and information about the facsimile number indicating the destination of the facsimile document. The data communication apparatus 101 then transmits the set of documents to the received facsimile number. If the transmission of the facsimile document is terminated by an error, such as a communication line failure, the transmission error notification unit 1101 of the data communication apparatus 101 notifies the information processing apparatus 102 of the transmission error.

In step S1002, if the sheet creation determination unit 1106 receives a transmission error notification from the data communication apparatus 101 (YES in step S1002), the process proceeds to step S1003. In step S1003, the sheet creation determination unit 1106 stores "transmission error" in a transmission result box corresponding to the transmission process among information in the transmission information management table. If the sheet creation determination unit does not receive a transmission error notification (NO is step S1002), the process proceeds to step S1004. In step S1004, the sheet creation determination unit 1106 stores "transmission successful" in the transmission result box corresponding to the transmission process among information in the transmission information management table.

In step S825, the facsimile transmission requesting unit 212 determines whether transmission requests about all facsimile documents stored in the transmission document storage unit 211 that have not been transmitted, are sent to the data communication apparatus 101. After the determination of step S825 is made for all facsimile documents that have not been transmitted, the facsimile transmission requesting unit 212 notifies the sheet creation determination unit 1106 that transmission of all facsimile documents are requested.

In step S1005, upon receiving the notification that transmission of all facsimile documents are requested, the sheet creation determination unit 1106 determines whether there is a facsimile document in which a transmission error has occurred. The determination by the sheet creation determination unit 1106 in step S1005 is made based on the transmission information management table. If "transmission error" is stored in at least one of the boxes in the transmission result column of the transmission information management table, the sheet creation determination unit 1106 determines that there is a facsimile document in which a transmission error has occurred (YES in step S1005). The process then proceeds to step S1006. If "transmission successful" is stored in all of the boxes in the transmission result column, the sheet creation determination unit 1106 determines that no error has occurred (NO in step S1005), and the process proceeds to step S829. In step S829, the sheet creation determination unit 1106 then notifies the data communication apparatus 101 about ending of the process.

In step S1006, the sheet creation determination unit 1106 further determines whether a transmission error occurred in all of the facsimile documents that the requesting unit requests to be transmitted. If all of the boxes in the transmission result column of the transmission information management table indicates "transmission error" (YES in step S1006), the process proceeds to step S829.

In step S1006, if "transmission error" and "transmission successful" are each stored at least once in the transmission result column of the transmission information management table, the sheet creation determination unit 1106 determines that a transmission error has occurred in transmitting some transmission documents (NO in step S1006) The process then proceeds to step S1007.

In step S1007, the re-transmission cover sheet creation unit 1103 and the re-transmission job sheet creation unit 1102 create a re-transmission cover sheet and a re-transmission job sheet respectively. In step S1008, the print requesting unit 1104 transmits the created re-transmission job sheet and re-transmission cover sheet to the printing unit 1105 in the data communication apparatus 101, and then the process proceeds to step S829.

FIG. 13 illustrates an example of a transmission information management table. The transmission information management table stores facsimile (FAX) numbers and cover sheet IDs that specify a destination of the transmission document, and the transmission results.

The example illustrated in FIG. 13 indicates that a transmission error has occurred when a transmission document attached to a cover sheet ID 0002 is transmitted to the FAX number "03-2222-2222". The transmissions of the facsimile document to the other facsimile numbers are successful as indicated in the example of FIG. 13.

Figure 14:
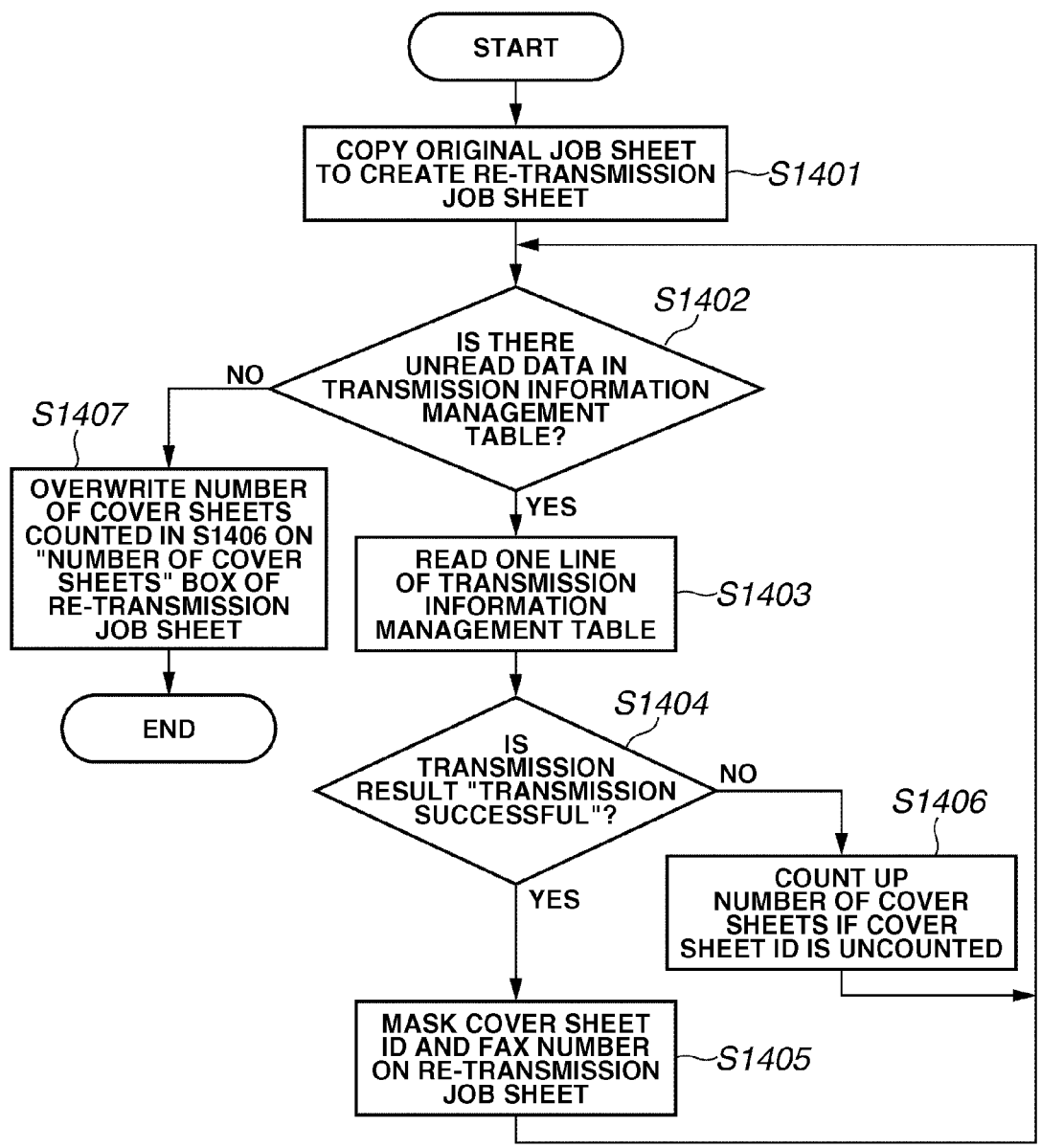
FIG. 14 is a flowchart illustrating a process for creating a re-transmission job sheet according to the second exemplary embodiment of the present invention.

Creation of a re-transmission job sheet by the re-transmission job sheet creation unit 1102 will be described below with reference to FIG. 14.

In step S1401, the re-transmission job sheet creation unit 1102, to prepare for creation of the re-transmission job sheet, creates a copy of a job sheet of the transmission process in which a transmission error has occurred. The re-transmission job sheet creation unit 1102 then reads the data stored in the transmission information management table, one line at a time. If the re-transmission job sheet creation unit 1102 determines that there is unread data in the transmission information table (YES in step S1402), the process proceeds to step S1403, and the re-transmission job sheet creation unit 1102 reads one line of data.

In step S1404, the re-transmission job sheet creation unit 1102 determines whether the read "transmission result" information is "transmission successful". If the transmission result is "transmission successful" (YES in step S1404), the process proceeds to step S1405. In step S1405, the re-transmission job sheet creation unit 1102 detects the boxes in which the "facsimile number" and the "cover sheet ID" information corresponding to the read "transmission result" are entered. The re-transmission job sheet creation unit 1102 then masks the portion where the detected information is entered, in the re-transmission job sheet.

The masking process described above is a process in which a portion of a job sheet data is marked out to conceal the information in a designated area. In the present embodiment, a masking process is performed by marking out the boxes in which the corresponding facsimile number and the cover sheet ID are entered. The information recognition unit 207 detects the facsimile number and the cover sheet ID from the re-transmission job sheet. For example, the information recognition unit 207 recognizes the frame borders of the boxes in which the facsimile number and the cover sheet ID are included. The information recognition unit 207 then recognizes a number entered inside the box as a facsimile number and an ID entered inside the box as a cover sheet ID. If the facsimile number of the search target matches the recognized facsimile number, and the cover sheet ID of the search target matches the recognized cover sheet ID, the re-transmission job sheet creation unit 1102 marks out the corresponding boxes.

In a case where the information of the "transmission result" read in step S1403 is "transmission error" (NO in step S1404), the process proceeds to step S1406. In step S1406, the re-transmission job sheet creation unit 1102 counts the number of cover sheets in which a "transmission error" has occurred. If the cover sheet ID read in step S1403 is a cover sheet ID that has not been counted, the re-transmission job sheet creation unit 1102 counts up the number of cover sheets.

The re-transmission job sheet creation unit 1102 performs the above-described process for all of the data in the transmission information management table. In step S1402, the re-transmission job sheet creation unit 1102 determines whether there is unread data in the transmission information management table. If there is no unread data (NO in step S1402), the process proceeds to step S1407, where the number of cover sheets counted in step S1406 is overwritten in the box where the number of cover sheets is entered on the re-transmission job sheet. To be more specific, the information recognition unit 207 recognizes the frame border of the box where the "number of cover sheets" is written in the re-transmission job sheet, and blanks out the inside of the box. The re-transmission job sheet creation unit 1102 then enters the number of cover sheets counted in step S1406 on top of the blanked box.

By performing the above-described process flow, the re-transmission job sheet creation unit 1102 creates a re-transmission job sheet. FIG. 18 illustrates an example of a re-transmission job sheet that the re-transmission job sheet creation unit 1102 creates using the transmission information management table illustrated in FIG. 13 and the job sheet illustrated in FIG. 6.

In the transmission information management table 1301 illustrated in FIG. 13, "transmission results" of data 1302, 1303, 1305 are "transmission successful". Therefore, the cover sheet ID "0001" and the corresponding facsimile number "03-3333-4444" are masked in the re-transmission job sheet illustrated in FIG. 18, as compared to the job sheet illustrated in FIG. 6. Additionally, the cover sheet ID "0002" and the corresponding facsimile number "03-1111-2222" and the cover sheet ID "0002" and the corresponding facsimile number "045-333-4444" are masked. On the contrary, since the "transmission result" of data 1304 is "transmission error", the cover sheet ID and the corresponding fax number in the re-transmission job sheet illustrated in FIG. 18 are not masked. Furthermore, since the data 1304 is subject to re-transmission, the number of cover sheets is counted up. Therefore, when using the transmission information management table illustrated in FIG. 13 and the job sheet in FIG. 6, the number of cover sheets to be re-transmitted is "1", which is entered into the "number of cover sheets" box 1801 in the re-transmission job sheet. As a result, the re-transmission job sheet illustrated in FIG. 18 is created.

A process in which the re-transmission cover sheet creation unit 1103 creates a re-transmission cover sheet is described below with reference to FIG. 15.

In step S1501, the re-transmission cover sheet creation unit 1103 determines whether there is unread data in the transmission information management table 1301. If there is unread data (YES in step S1501), the process proceeds to step S1502 in which the re-transmission cover sheet creation unit 1103 reads one line of data in the transmission information management table 1301.

In step S1503, the re-transmission cover sheet creation unit 1103 determines whether the read "cover sheet ID" corresponds to a cover sheet addressed to a plurality of destinations. If the "cover sheet ID" corresponds to a cover sheet addressed to a single destination (NO in step S1503), the process returns to step S1501. On the other hand, if the read "cover sheet ID" corresponds to a cover sheet addressed to a plurality of destinations (YES in step S1503), the process proceeds to step S1504.

In step S1504, the re-transmission cover sheet creation unit 1103 determines whether the read "transmission result" is "transmission successful" or "transmission error". If the "transmission result" indicates "transmission successful" (YES in step S1504), the process proceeds to step S1505. In step S1505, the re-transmission cover sheet creation unit 1103 counts up the number of destinations and the number of successful transmissions corresponding to the cover sheet ID. On the contrary, if the "transmission result" indicates "transmission error" (NO in step S1504), the process proceeds to step S1506. In step S1506, the re-transmission cover sheet creation unit 1103 counts only the destinations corresponding to the cover sheet ID.

A summary table illustrated in FIG. 16 manages the values of the number of destinations and the number of successful transmissions corresponding to the cover sheet ID. That is, the summary table manages a cover sheet ID, the number of addresses designated by a cover sheet that is identified by the cover sheet ID, and the number of successful transmissions to the destinations. The initial values of the number of destinations and the number of successful transmissions corresponding to a cover sheet ID are zero, and every time the numbers are counted up, the values increase by one.

The re-transmission cover sheet creation unit 1103 performs the above-described processes from step S1501 to step S1506 for all data in the transmission information management table 1301. When there is no unprocessed data (NO in step S1501), the process proceeds to step S1507.

In step S1507, the re-transmission cover sheet creation unit 1103 reads the data managed by the summary table and determines whether there is unread data. If there is unread data in the summary table (YES in step S1507), the process proceeds to step S1508 in which the re-transmission cover sheet creation unit 1103 reads one line of data from the summary table. If there is no unread data in the summary table (NO in step S1507), the process ends.

In step S1509, the re-transmission cover sheet creation unit 1103 determines whether the number of successful transmissions in the read data is zero or the number of successful transmissions matches the number of destinations in the read data. If the number of successful transmissions in the read data is zero, or the number of successful transmissions matches the number of destinations in the read data (YES in step S1509), the process returns to step S1507. That is, the process returns to step S1507 when transmission to all destinations has generated an error, or transmission to all addresses was successful.

If a transmission error has occurred in transmission to some of the destinations (NO in step S1509), the re-transmission cover sheet creation unit 1103 creates re-transmission cover sheets corresponding to the cover sheet IDs in which a transmission error has occurred.

In step S1510, the re-transmission cover sheet creation unit 1103 determines whether there is a re-transmission cover sheet corresponding to the cover sheet ID in which a transmission error has occurred. If there is no cover sheet corresponding to the cover sheet ID in which a transmission error has occurred (NO in step S1510), the process proceeds to step S1511. In step S1511, the re-transmission cover sheet creation unit 1103 copies the original cover sheet corresponding to the cover sheet ID. On the other hand, if there is a re-transmission cover sheet corresponding to the cover sheet ID in which a transmission error has occurred (YES in step S1510), the process proceeds to step S1512.

In step S1512, the re-transmission cover sheet creation unit 1103 detects from the transmission information management table 1301 a facsimile number which corresponds to "transmission successful". The re-transmission cover sheet creation unit 1103 then masks the detected facsimile number among the facsimile numbers that are indicated on the re-transmission cover sheet. The re-transmission cover sheet creation unit 1103 marks out the inside of the frame border of a box in which a facsimile number corresponding to "transmission successful" is entered, similar to the masking process described in the creation of the re-transmission job sheet.

The re-transmission cover sheet creation unit 1103 performs the above-described process from step S1507 to step S1512 for all data in the summary table. When there is no unprocessed data (NO in step S1507), the creation of the re-transmission cover sheet ends.

As described above, a re-transmission cover sheet is created if a transmission error has occurred in transmission to a part of a plurality of destinations indicated on a cover sheet addressed to a plurality of destinations. Since it is not necessary to re-create a cover sheet addressed to a single destination, a re-transmission cover sheet is created based on a cover sheet addressed to a plurality of destinations. That is, an original cover sheet can be used when re-transmitting a transmission document which is transmitted with a cover sheet addressed to a single destination. Additionally, an original cover sheet can be used when a transmission error has occurred in all transmissions using a cover sheet addressed to a plurality of destinations. In a case where all transmissions using a cover sheet addressed to a plurality of destinations are successful, it is not necessary to create a re-transmission cover sheet.

Figure 15:
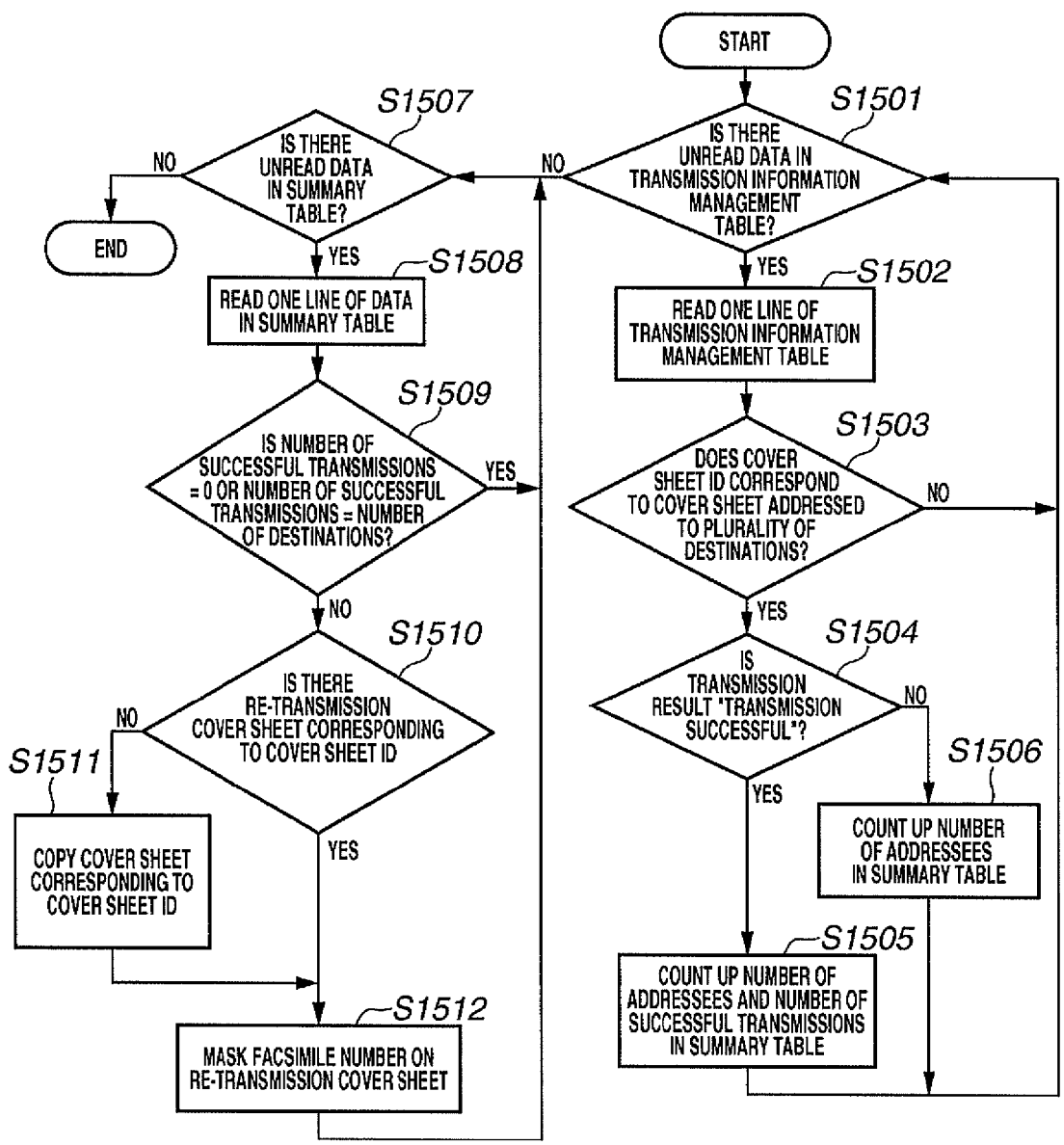
FIG. 15 is a flowchart illustrating a process for creating a re-transmission coversheet according to the second exemplary embodiment of the present invention.

The summary table illustrated in FIG. 16 is created by performing the process flow illustrated in FIG. 15 for creating a re-transmission cover sheet on the transmission information management table illustrated in FIG. 13. In the example of FIG. 16, only the cover sheet identified by the cover sheet ID 0002 is addressed to a plurality of destinations. Consequently, the summary table records the number of destinations and the number of successful transmissions corresponding to the cover sheet ID 0002. In performing transmission to three destinations, there are two successful transmissions. Therefore, "3" is recorded in the number of destinations and "2" in the number of successful transmissions.

FIG. 17 illustrates an example of a re-transmission cover sheet which is created according to the summary table illustrated in FIG. 16. As a result of performing the process illustrated in FIG. 15, the facsimile numbers to which the transmission were successful (i.e., "03-1111-2222" and "045-333-

4444") are masked, based on the information about the cover sheet ID 0002 stored in the transmission information management table 1301.

According to the present embodiment, a re-transmission job sheet and a re-transmission cover sheet are created by copying the original job sheet and cover sheet, and masking the address information (facsimile number) of the destination on the job sheet and cover sheet, to which transmission is unnecessary. However, the present invention is not limited to the above method, and a re-transmission job sheet and a re-transmission cover sheet can be created by other methods. For example, all cover sheet IDs and facsimile numbers on an original job sheet can be deleted, and cover sheet IDs and facsimile numbers that are necessary for the re-transmission can be inserted. Moreover, the information processing apparatus 102 can be provided with job sheet and cover sheet templates in which there are no actual information, and a user can fill-in the necessary data for re-transmission.

When the facsimile transmission unit 203 re-transmits a facsimile document in which a transmission error has occurred, the facsimile transmission unit 203 causes the scanner unit 201 to read the facsimile document in addition to the re-transmission job sheet and the re-transmission cover sheet that are printed by the printing unit 1105 in the data communication apparatus 101. The facsimile transmission unit 203 then re-transmits the facsimile document.

As described above, the data communication system according to the present embodiment automatically creates a re-transmission job sheet and a re-transmission cover sheet when an error has occurred in the transmission of a facsimile document. As a result, the process of re-transmission is simplified.

In the first and second embodiments, the data communication apparatus 101 transmits a facsimile document to an external apparatus. However, the data can be transmitted to the external apparatus in other forms. For example, a document data can be attached to an e-mail and transmitted to the external apparatus. In such a case, the information which specifies the destination indicated on a cover sheet can be an e-mail address, such as aaa@bbb.co.jp. Methods other than facsimile or e-mail can be employed if the data communication apparatus 101 can specify the external apparatus by specification information in a character code or the like.

The present invention can further be achieved by providing a storage medium, which stores software (program code) for realizing the processes of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the processes of the embodiments. The software (program code) itself and the storage medium, which stores the software (program code), constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-024433 filed Feb. 2, 2007, which is hereby incorporated by reference herein in its entirety.

What is claimed is:

1. A data communication system, comprising:
an input unit configured to input image data by reading an image on an original document;
a transmission unit configured to transmit image data input by the input unit to at least one of a plurality of destinations;
a determination unit configured to determine whether image data input by the input unit is document data to be transmitted to a destination, cover sheet data which includes destination specifying information for specifying a destination of the document data, or job sheet data which includes verification information for verifying destination specifying information included in the cover sheet data; and
a control unit configured to control the transmission unit to transmit document data corresponding to the cover sheet data to a destination specified by the destination specifying information if the destination specifying information included in the cover sheet data matches the verification information included in the job sheet data, wherein, if the determination unit determines that a plurality of pages of image data continuously input by the input unit includes the cover sheet data, the document data corresponding to the cover sheet data, and the job sheet data, the control unit prohibits transmission of document data corresponding to the cover sheet data to a destination specified by the destination specifying information if the destination specifying information included in the cover sheet data does not match the verification information included in the job sheet data.

2. The data communication system according to claim 1, wherein the control unit controls the transmission unit to transmit document data corresponding to the cover sheet data to a destination specified by the destination specifying information if a number of the cover sheet data indicated by the information about a number of data included in the job sheet data matches a number of the cover sheet data, and the destination specifying information included in the cover sheet data matches the verification information included in the job sheet data, wherein, if the determination unit determines that the cover sheet data, the document data corresponding to the cover sheet data, and the job sheet data are included in a plurality of pages of image data continuously input by the input unit, the control unit prohibits transmission of document data corresponding to the cover sheet data to a destination specified by the destination specifying information if a number of the cover sheet data indicated by the information about a number of data included in the job sheet data does not match a number of the cover sheet data or the destination specifying information included in the cover sheet data does not match the verification information included in the job sheet data.

3. The data communication system according to claim 1, wherein the transmission unit converts the image data to facsimile data, and transmits the facsimile data to the destination using a facsimile communication protocol.

4. The data communication system according to claim 1, wherein the control unit controls the transmission unit to transmit document data corresponding to the cover sheet data to a destination specified by the destination specifying information if a first cover sheet specifying information included in the job sheet data for specifying the cover sheet data information matches a second cover sheet data included in the cover sheet data for specifying the cover sheet, and wherein, if the determination unit determines that a plurality of pages of image data continuously input from the input unit includes the cover sheet data, the document data corresponding to the cover sheet data, and the job sheet data, the control unit prohibits transmission of document data corresponding to the cover sheet data to a destination specified by the destination specifying information if the first cover sheet specifying information does not match the second cover sheet specifying information.

5. The data communication system according to claim 1, wherein the control unit controls the transmission unit to transmit document data corresponding to the cover sheet data to a destination which is specified by the destination specifying information if a page count information which indicates the number of pages of document data and which is included in the cover sheet matches a number of pages of document data corresponding to the cover sheet data input by the input unit, and wherein, if the determination unit determines that a plurality of pages of image data continuously input from the input unit includes the cover sheet data, the document data corresponding to the cover sheet data, and the job sheet data, the control unit prohibits transmission of document data corresponding to the cover sheet data to a destination which is specified by the destination specifying information if a page count information which indicates the number of pages of document data and which is included in the cover sheet does not match a number of pages of document data corresponding to the cover sheet data input by the input unit.

6. The data communication system according to claim 1, wherein the control unit controls the transmission unit to transmit the cover sheet data and document data corresponding to the cover sheet data to a destination which is specified by the destination specifying information, if a number of cover sheet data indicated in the information on number of data included in the job sheet data matches a number of the cover sheet data, and the destination specifying information included in the cover sheet data matches the verification information included in the job sheet data, and wherein, if the determination unit determines that a plurality of pages of image data continuously input from the input unit includes the cover sheet data, the document data corresponding to the cover sheet data, and the job sheet data, the control unit prohibits transmission of the cover sheet data and document data corresponding to the cover sheet data to a destination which is specified by the destination specifying information if a number of cover sheet data indicated in the information on number of data that is included in the job sheet data does not match a number of the cover sheet data or the destination specifying information included in the cover sheet data does not match the verification information included in the job sheet data.

7. The data communication system according to claim 1, further comprising: a cover sheet data creation unit configured to create, if the cover sheet data includes a plurality of the destination specifying information for transmitting the document data to a plurality of destinations, a plurality of cover sheet data that includes one of a plurality of destination specifying information,
wherein the transmission unit transmits each of a plurality of set of documents in which the document data is added to each of a plurality of cover sheet data created by the cover sheet data creation unit to a destination corresponding to each set of documents.

8. The data communication system according to claim 1, further comprising:
an error generation determination unit configured to determine whether an error has occurred in a transmission by the transmission unit;
a re-transmission job sheet creation unit configured to create, if the error generation determination unit determines that an error has occurred, a re-transmission job sheet data that includes verification information for verifying a destination of a transmission in which the error has occurred;
a re-transmission cover sheet creation unit configured to create, if the error generation determination unit determines that an error has occurred, a re-transmission cover sheet data that includes destination specifying information for specifying a destination of a transmission in which the error has occurred; and
a printing unit configured to print according to a re-transmission job sheet data created by the re-transmission job sheet creation unit and a re-transmission cover sheet data created by the re-transmission cover sheet creation unit.

9. A method for controlling a data communication system for transmitting document data, the method comprising:
reading an image on an original document;
inputting the image as image data;
transmitting the image data to at least one of a plurality of destinations;
determining whether the image data is document data to be transmitted to a destination, cover sheet data which includes destination specifying information for specifying a destination of the document data, or job sheet data which includes verification information for verifying the destination specifying information included in the cover sheet data; and
transmitting, in a case where a plurality of pages of image data that is continuously input includes the cover sheet data, the document data corresponding to the cover sheet data, and the job sheet data, the cover sheet data and document data corresponding to the cover sheet data to a destination specified by the destination specifying information if the destination specifying information included in the cover sheet data matches the verification information included in the job sheet data,
wherein transmission of document data corresponding to the cover sheet data to a destination specified by the destination specifying information is prohibited if the destination specifying information included in the cover sheet data does not match the verification information included in the job sheet data.

10. The method according to claim 9, further comprising:
transmitting the cover sheet data and document data corresponding to the cover sheet data to a destination specified by the destination specifying information if a number of the cover sheet data indicated by the information about a number of data that is included in the job sheet data matches a number of the cover sheet data and the destination specifying information included in the cover sheet data matches the verification information included in the job sheet data,
wherein, if it is determined that a plurality of pages of image data includes the cover sheet data, the document data corresponding to the cover sheet data, and the job sheet data transmission of the cover sheet data and document data corresponding to the cover sheet data to a destination specified by the destination specifying information is prohibited if a number of the cover sheet data indicated by the information about a number of data that is included in the job sheet data does not match a number of the cover sheet data or the destination specifying information included in the cover sheet data does not match the verification information included in the job sheet data.

11. The method according to claim 9, further comprising:
converting the image data to facsimile data and transmitting the facsimile data to the destination using a facsimile communication protocol.

12. The method according to claim 9, further comprising:
transmitting document data corresponding to the cover sheet data to a destination specified by the destination specifying information if a first cover sheet specifying information included in the job sheet data for specifying the cover sheet data matches a second cover sheet specifying information included in the cover sheet data for specifying the cover sheet,
wherein, if it is determined that a plurality of pages of image data includes the cover sheet data, the document data corresponding to the cover sheet data, and the job sheet data, transmission of document data corresponding to the cover sheet data to a destination specified by the destination specifying information is prohibited if the first cover sheet specifying information does not match the second cover sheet specifying information.

13. The method according to claim 9, further comprising:
transmitting document data corresponding to the cover sheet data to a destination which is specified by the destination specifying information if a page count information which is included in the cover sheet and which indicates the number of pages of document data matches a number of pages of document data corresponding to the cover sheet data,
wherein, if it is determined that a plurality of pages of image data includes the cover sheet data, the document data corresponding to the cover sheet data, and the job sheet data, transmission of document data corresponding to the cover sheet data to a destination which is specified by the destination specifying information is prohibited if a page count information which is included in the cover sheet and which indicates the number of pages of document data does not match a number of pages of document data corresponding to the cover sheet data.

14. The method according to claim 9, further comprising:
transmitting the cover sheet data and document data corresponding to the cover sheet data to a destination which is specified by the destination specifying information if a number of cover sheet data indicated in the information on number of data that is included in the job sheet data matches a number of the cover sheet data and the destination specifying information included in the cover sheet data matches the verification information included in the job sheet data,
wherein, if it is determined that a plurality of pages of image data includes the cover sheet data, the document data corresponding to the cover sheet data, and the job sheet data, transmission of the cover sheet data and document data corresponding to the cover sheet data to a destination which is specified by the destination specifying information is prohibited if a number of cover sheet data indicated in the information on number of data that is included in the job sheet data does not match a number of the cover sheet data or the destination specifying information included in the cover sheet data does not match the verification information included in the job sheet data.

15. The method according to claim 9, further comprising:
creating, if the cover sheet data includes a plurality of the destination specification information for transmitting the document data to a plurality of destinations, a plurality of cover sheet data including one of a plurality of destination specifying information; and
transmitting each of a plurality of documents sets in which the document data is added to each of a plurality of created cover sheet data to a destination corresponding to each set of documents.

16. The method according to claim 9, further comprising:
determining whether an error has occurred in a transmission;
creating, if it is determined that an error has occurred, a re-transmission job sheet data including verification information for verifying a destination of a transmission in which the error has occurred;
creating a re-transmission cover sheet data, if it is determined that an error has occurred, including destination specifying information for specifying a destination of a transmission in which the error has occurred; and
performing printing according to the created re-transmission job sheet data and the created re-transmission cover sheet data.

17. A non-transitory computer-readable storage medium storing computer-executable process steps, the computer-executable process steps causing a computer to execute the method of claim 9.

* * * * *